Sept. 12, 1939.  J. L. MONTGOMERY  2,172,962
VOLTAGE DOUBLER CIRCUIT
Filed May 11, 1939
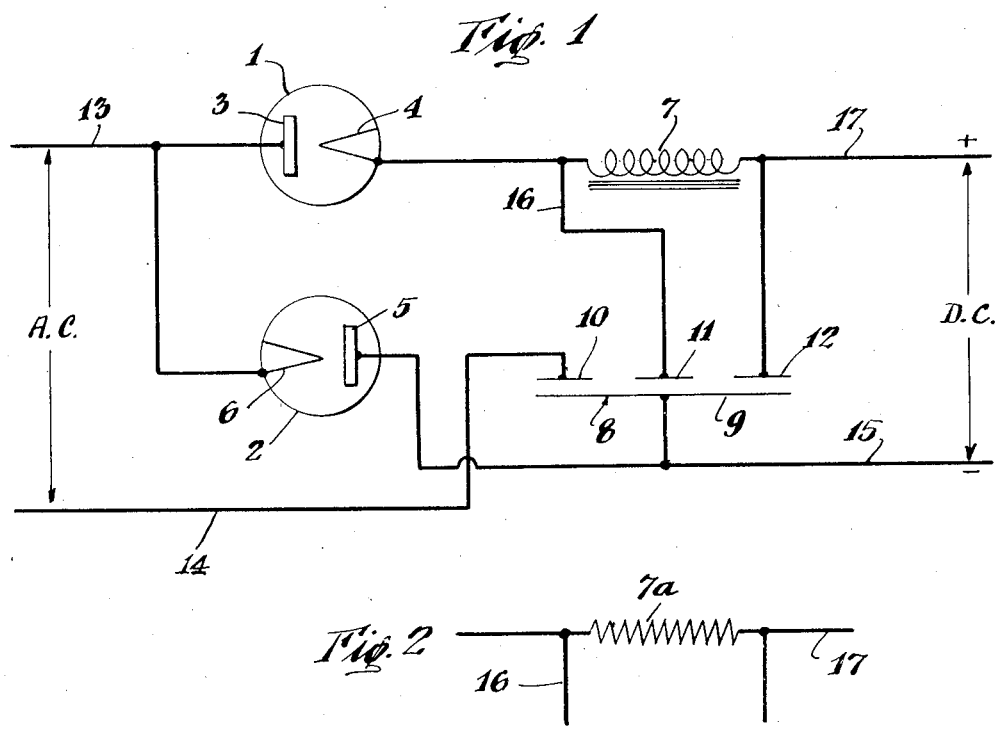
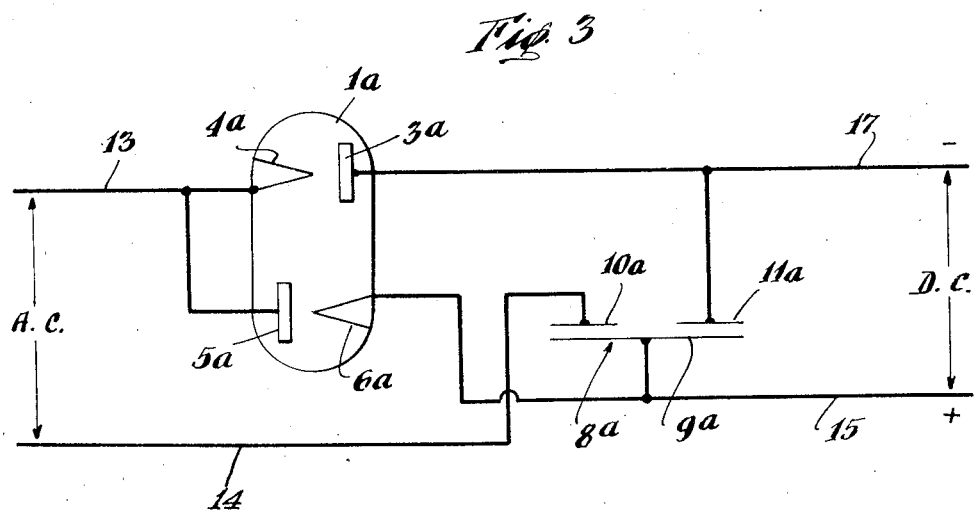
INVENTOR
James L. Montgomery
BY
ATTORNEY Patented Sept. 12, 1939

2,172,962

UNITED STATES PATENT OFFICE 2,172,962

VOLTAGE DOUBLER CIRCUIT

James L. Montgomery, Indianapolis, Ind., assignor to P. R. Mallory & Co., Inc., Indianapolis, Ind., a corporation of Delaware Application May 11, 1939, Serial No. 272,953

4 Claims. (Cl. 175—363)

This invention relates to voltage doubler circuits for increasing the voltage output of rectifier systems.

An object of the invention is to improve voltage doubler circuits and the like.

Other objects of the invention will be apparent from the following description and accompanying drawing taken in connection with the appended claims.

The invention comprises the features of construction, arrangement of parts, and method of operation referred to above or which will be brought out and exemplified in the disclosure hereinafter set forth, including the illustrations in the drawing.

In the drawing:

Figure 1 shows an embodiment of my invention in a voltage doubler circuit;

Figure 2 shows a modification of part of the circuit; and

Figure 3 llustrates another circuit.

A feature of the present invention resides in the novel circuit arrangement and location of capacitances for enhancing the voltage output of a rectifier circuit. In a preferred embodiment of the invention a common electrode type of electrolytic or electrostatic condenser is used.

While a preferred embodiment of the invention is described herein, it is contemplated that considerable variation may be made in the method of procedure and the construction of parts without departing from the spirit of the invention. In the following description and in the claims, parts will be identified by specific names for convenience, but they are intended to be as generic in their application to similar parts as the art will permit.

Referring to the drawing the voltage doubler circuit shown in Figure 1 comprises an A. C. input circuit comprising conductors 13 and 14, oppositely connected rectifier tubes or cells 1 and 2, a common cathode capacitor 8 having a common cathode plate 9 and three anode plates 10, 11 and 12, a choke coil 7 and a D. C. output circuit comprising conductors 15 and 17. Anode plates 10, 11 and 12 form respectively separate condensers with cathode 9, which condensers will, for convenience be spoken of as condensers 10, 11 and 12. Condenser 10 is directly in series with conductor 14 of the A. C. input circuit. Condensers 11 and 12 in conjunction with choke coil 7 comprise a filter in the D. C. output circuit.

The operation of the circuit is as follows:

Assuming that conductors 13 and 14 have just been connected to a source of alternating current which is at that part of its cycle which sends a positive charge over conductor 14, the plate 10 will be positively charged and plate 9 negatively charged from the A. C. circuit through rectifier 2. The charging circuit for condenser 10 comprises A. C. conductor 14, condenser 10, conductor 15, rectifier tube 2 comprising anode 5 and cathode 6 and conductor 13 of the A. C. circuit.

Upon reversal of the polarity of the A. C. input voltage condenser 11 is charged from the A. C. circuit through rectifier tube 1 as follows: From conductor 13 of the A. C. circuit through tube 1 comprising anode 3 and cathode 4, over conductor 16, condenser 11, condenser 10 and conductor 14 of the A. C. circuit. Condenser 10, being in series with the A. C. circuit, its voltage due to its previously acquired charge is added to the instantaneous A. C. line voltage thereby substantially doubling the voltage applied to condenser 11.

The cycle is then repeated. Since the D. C. output circuit is fed by condenser 11 it receives the same output voltage as is applied to this condenser, the A. C. ripple being filtered out by the filter circuit comprising choke coil 7 and condensers 11 and 12.

An advantage of this circuit arrangement is that it permits the use of a single common electrode type of condenser for both the filter and the voltage doubling effects. This greatly lowers the cost of such a circuit and enables construction of a more convenient and compact device.

Figure 2 illustrates a modification of the circuit of Figure 1 wherein the choke coil 7 is replaced by a resistance 7a, the operation of the circuit being substantially the same.

Figure 3 illustrates a simplified circuit wherein the voltage doubling effect is obtained but certain of the filtering elements are omitted. In this circuit a dual tube 1a is used having anodes 3a and 5a and cathodes 4a and 6a. The connection of anodes and cathodes are the reverse of Figure 1. In this case a common anode capacitor 8a is used having an anode plate 9a and cathode plate 10a and 11a. The operation of this circuit is the same as that of Figure 1 but the polarities are reversed and filtering of the output is not obtained.

(It is obvious that a dual tube or a common anode capacitor, or both, can also be used in the circuit of Figure 1).

While the present invention, as to its objects and advantages, has been described herein as carried out in specific embodiments thereof, it is not desired to be limited thereby but it is intended to cover the invention broadly within the spirit and scope of the appended claims.

What is claimed is:

1. A voltage doubler circuit comprising an A. C. input circuit, a pair of rectifiers, a condenser having a common plate and at least two individual plates co-operating therewith, and a D. C. output circuit, one of said rectifiers being connected between one side of said A. C. circuit and one side of said D. C. circuit in a first polarity direction, the other of said rectifiers being connected between the same side of said A. C. circuit and the opposite side of said D. C. circuit in an opposite polarity direction, the common plate of said condenser being connected to one side of said D. C. circuit, one of said individual plates being connected to the other side of said D. C. circuit, and another of said individual electrodes being connected to the side of said A. C. circuit opposite the aforementioned side thereof.

2. A rectifier voltage doubler circuit comprising an A. C. input circuit and a D. C. output circuit, a pair of oppositely disposed rectifiers connected between a first conductor of said A. C. circuit and the conductors of said D. C. circuit, respectively, a condenser having a pair of individual electrodes and a common electrode, one of said individual electrodes being connected to one conductor of said D. C. circuit and the common electrode being connected to the other conductor of said D. C. circuit, the other of said individual electrodes being connected to the second conductor of said A. C. circuit.

3. A voltage doubler circuit comprising an A. C. input circuit, a pair of rectifiers, a current limiting impedance, a condenser having a common electrode and three individual electrodes co-operating therewith, and a D. C. output circuit, one of said rectifiers being connected between one side of said A. C. circuit and one side of said D. C. circuit in a first polarity direction, the other of said rectifiers being connected between the same side of said A. C. circuit and the opposite side of said D. C. circuit in an opposite polarity direction, said impedance being connected in series with one side of said D. C. output circuit and the common electrode of said condenser being connected to the opposite side of said D. C. circuit, one of said individual electrodes being connected to the side of said A. C. circuit opposite the aforementioned side thereof, the other two of said individual electrodes being connected to the opposite ends of said impedance.

4. A rectifier voltage doubler circuit comprising an A. C. input circuit and a D. C. output circuit, a pair of oppositely disposed rectifiers connected between a first conductor of said A. C. circuit and the conductors of said D. C. circuit, respectively, a filter in said D. C. circuit comprising a current limiting impedance in series with one conductor thereof and a condenser having a pair of individual electrodes connected to the opposite ends of said impedance and a common electrode connected to the other conductor of said D. C. circuit, said condenser having a third individual electrode co-operating with said common electrode and connected to the second conductor of said A. C. circuit.

JAMES L. MONTGOMERY.